US012543658B2

(12) United States Patent
Baughman et al.

(10) Patent No.: US 12,543,658 B2
(45) Date of Patent: Feb. 10, 2026

(54) RECOVERING LED LIGHT IN INDOOR MULTI-LEVEL FARMS (71) Applicant: INTERNATIONAL BUSINESS MACHINES CORPORATION, Armonk, NY (US)

(72) Inventors: Aaron K. Baughman, Cary, NC (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 18/323,584

(22) Filed: May 25, 2023

(65) Prior Publication Data

US 2024/0389517 A1 Nov. 28, 2024

(51) Int. Cl.
*A01G 7/04* (2006.01)
*G06T 7/73* (2017.01)
(Continued)

(52) U.S. Cl.
CPC ............... *A01G 7/045* (2013.01); *G06T 7/73* (2017.01); *G06V 20/00* (2022.01); *G06V 20/188* (2022.01);
(Continued)

(58) Field of Classification Search
CPC ...... G06V 20/50; G06V 20/188; G06V 20/00; G06T 7/73; G06T 2207/10024; G06T 2207/30188; A01G 7/045
See application file for complete search history.

(56) References Cited

U.S. PATENT DOCUMENTS 10,398,092 B2 9/2019 Sahni
11,483,981 B1 11/2022 Lo
(Continued)

FOREIGN PATENT DOCUMENTS

CN 110122374 A 8/2019
EP 3007544 A1 4/2016
(Continued)

OTHER PUBLICATIONS

Agarwal, et al., "Old MacDonald had a smart farm: Building a testbed to study cybersecurity in smart dairy farming" CSET '22: Proceedings of the 15th Workshop on Cyber Security Experimentation and Test [research article], Aug. 8, 2022, 9 pages, ACM, DOI: 10.1145/3546096.3546097, Retrieved from the Internet: <URL: https://dl.acm.org/doi/10.1145/3546096.3546097D>.
(Continued)

Primary Examiner — Tracy Mangialaschi
(74) Attorney, Agent, or Firm — Teddi E. Maranzano (57) ABSTRACT

Systems and methods are provided for recovering LED light in indoor multi-level farms. A plurality of cameras and sensors capture in real time in a vertical farm environment a plurality of camera images and sensor data. The camera images include physical images of the vertical farm environment, and the sensor data includes light data. The camera images and sensor data are analyzed to identify a pattern of light origin and direction in the vertical farm environment. The plant characteristics are identified based on comparing the captured camera images, using image recognition, against a model. Based on the identified plant characteristics, manipulating the light data. The plant characteristics include plant species growth state and general health. The light is manipulated by breaking it into component visible light wavelengths. The model predicts optimizing the redi-
(Continued)

recting of the optimal wavelengths for improved plant growth.

17 Claims, 4 Drawing Sheets

(51) Int. Cl.
  *G06V 20/00* (2022.01)
  *G06V 20/10* (2022.01)
  *G06V 20/50* (2022.01)
(52) U.S. Cl.
  CPC .... *G06V 20/50* (2022.01); *G06T 2207/10024* (2013.01); *G06T 2207/30188* (2013.01)

(56) References Cited

U.S. PATENT DOCUMENTS

| | | | |
|---|---|---|---|
| 2016/0270304 | A1 | 9/2016 | Higgins |
| 2017/0034895 | A1 | 2/2017 | Vogel |
| 2019/0029201 | A1 | 1/2019 | Griffin |
| 2021/0027057 | A1* | 1/2021 | Genty ............... G06V 20/188 |
| 2022/0022381 | A1* | 1/2022 | Li ........................ F21V 14/006 |
| 2023/0148484 | A1* | 5/2023 | Gardner ............... A01G 31/06 47/65 |

FOREIGN PATENT DOCUMENTS

| | | |
|---|---|---|
| JP | 2016082900 A | 5/2016 |
| WO | 2014198838 A1 | 12/2014 |

OTHER PUBLICATIONS

Choubchilangroudi, et al., "Investigation the effectiveness of light reflectors in transmitting sunlight into the vertical farm depth to reduce electricity consumption," Cleaner Engineering and Technology [journal], Apr. 2022, 8 pages, vol. 7, DOI: 10.1016/j.clet.2022. 100421, Retrieved from the Internet: <URL: https://www.sciencedirect.com/science/article/pii/S266679082200026X?via%3Dihub>.

Disclosed Anonymously, "Intelligent Workflow for Precision Agriculture Using a Digital Twin and Augmented Reality." IP.com, Jan. 11, 2023, 4 pages, IP.com No. IPCOM000271573D, Retrieved from the Internet: <URL: https://priorart.ip.com/IPCOM/000271573>.

Leshed, et al., "Our life is the farm and farming is our life: home-work coordination in organic farm families," CSCW 14: Proceedings of the 17th ACM conference on Computer supported cooperative work & social computing [research article], Feb. 2014, pp. 487-498, DOI: 10.1145/2531602.2531708, Retrieved from the Internet: <URL: https://dl.acm.org/doi/10.1145/2531602.2531708>.

Moharatha, et al., "Vertical Farming Using Internet of Things," iJRASET Journal For Research in Applied Science and Engineering Technology, May 2022, 7 pages, vol. 10, Issue V, DOI: 0.22214/ijraset.2022.42982, Retrieved from the Internet: <URL: https://www.ijraset.com/research-paper/vertical-farming-using-iot>.

Nájera, et al., "LED Lighting in Vertical Farming Systems Enhances Bioactive Compounds and Productivity of Vegetables Crops," Biology and Life Sciences Forum [proceeding paper], Apr. 15, 2022, 8 pages, vol. 16, No. 1, Art. 24, MDPI, DOI: 10.3390/IECHo2022-12514, Retrieved from the Internet: <URL: https://www.mdpi.com/2673-9976/16/1/24>.

Saxena, "LEDs for Indoor Farming—Future of Agritech?", BISinfotech [article], Jan. 19, 2022 [accessed on Mar. 6, 2023], 9 pages, Retrieved from the Internet: <URL: https://www.bisinfotech.com/leds-lighting-in-indoor-and-vertical-farming/>.

Turner, et al., "Development of a high bandwidth multi-phase multilevel power supply for electricity supply network emulation," 2005 European Conference on Power Electronics and Applications, [Accessed on Mar. 8, 2023], 7 pages, IEEE Xplore, Dresden, DE, DOI: 10.1109/EPE.2005.219409, Retrieved from the Internet: <URL: https://ieeexplore.ieee.org/document/1665599>.

Vairagade, et al., "Secured Multi-Tier Mutual Authentication Protocol for Secure loT System," 9th IEEE International Conference on Communication Systems and Network Technologies, 2020 [accessed on Mar. 8, 2023], pp. 195-200, IEEE Xplore, Gwalior, In, Doi: 10.1109/CSNT.2020.37, Retrieved from the Internet: < URL: https://leeexplore.IEEE.org/document/9115786>.

\* cited by examiner

EXAMPLES OF KNOWLEDGE CORPUS POPULATION:

| WAVELENGTH INTERVAL | FREQUENCY INTERVAL |
|---|---|
| ~ 430 to 380 nm | ~ 700 to 790 THz |
| ~ 500 to 430 nm | ~ 600 to 700 THz |
| ~ 520 to 500 nm | ~ 580 to 600 THz |
| ~ 565 to 520 nm | ~ 530 to 580 THz |
| ~ 590 to 565 nm | ~ 510 to 530 THz |
| ~ 625 to 590 nm | ~ 480 to 510 THz |
| ~ 740 to 625 nm | ~ 405 to 480 THz |

RECOVERING LED LIGHT IN INDOOR MULTI-LEVEL FARMS

BACKGROUND

This invention relates generally to computer systems, and more particularly to augmented reality.

In agricultural applications, LED lights are used to enhance plant growth on many levels, including increasing vitamin and antioxidant levels.

Conventional greenhouses have relied on high-pressure sodium (HPS) lamps to supplement sunlight, but HPS lights have high power consumption and generate damaging heat levels, making HPS lamps inappropriate for use near young greens or microgreens. Greenhouses, still the bulk of enclosed environment agriculture, are trending toward a combination of HPS and LED lighting for supplemental lighting, with the likelihood of transitioning to all LED.

It would be advantageous to provide a system for optimizing LED lights in indoor multi-level farms by capturing and redirecting unused or wasted light (spillage, scatter).

SUMMARY

Systems and methods are provided for recovering LED light in indoor multi-level farms. A plurality of cameras and sensors capture in real time in a vertical farm environment a plurality of camera images and sensor data. The camera images include physical images of the vertical farm environment, and the sensor data includes light data. The camera images and sensor data are analyzed to identify a pattern of light origin and direction in the vertical farm environment. The plant characteristics are identified based on comparing the captured camera images, using image recognition, against a model. Based on the identified plant characteristics, manipulating the light data. The plant characteristics include plant species growth state and general health. The light is manipulated by breaking it into component visible light wavelengths. The model predicts optimizing the redirecting of the optimal wavelengths for improved plant growth.

Embodiments are further directed to computer systems and computer program products having substantially the same features as the above-described computer-implemented method.

DETAILED DESCRIPTION OF THE INVENTION

LED lights are used in agricultural applications to enhance plant growth, including increasing vitamin and antioxidant levels. Multi-level agriculture is an especially important industry in which land, such as inner city lots and unused vacant buildings, that is typically unsuited for farming can be made productive. Through analysis of historical results, the optimum mix of plants and planting densities is evolving, as is the type and quality of lighting employed.

Figure 2:
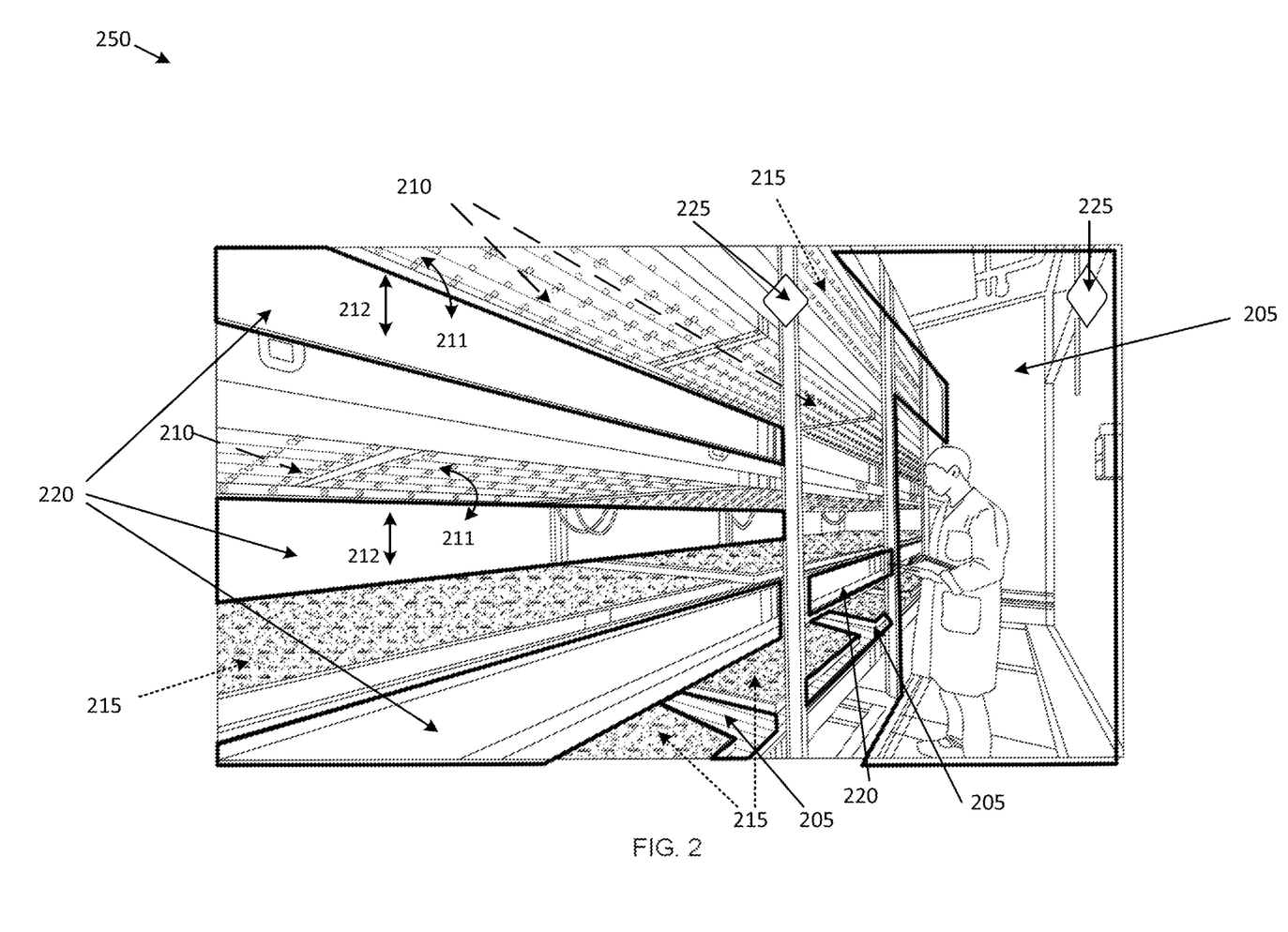
FIG. 2 illustrates an example indoor multi-level farm environment 250 where embodiments of the present invention can be practiced.

While conventional greenhouses have relied on high-pressure sodium (HPS) lamps to supplement sunlight, HPS lights can be ill-suited to solar-free and indoor multi-level agriculture because they consume far more power to produce the same light levels as sunlight might. HPS lights also generate too much heat to place near young greens and delicate microgreens. While the combination of HPS and LED lights may be increasing in traditional greenhouse usage, of the two only LED lighting is feasible for multi-level vertical agriculture. However, planning for the optimal combination and density of plant species and LED lighting placement may cause wasting of power, as LED light falls in areas where it is neither wanted nor needed, as shown in FIG. 2. Therefore, an important opportunity exists to recover this misdirected LED light. Additionally, the recovered LED light can be analyzed by its component wavelengths to optimize how the various wavelengths can be redirected to planting areas where it can yield the most beneficial result.

Figure 1:
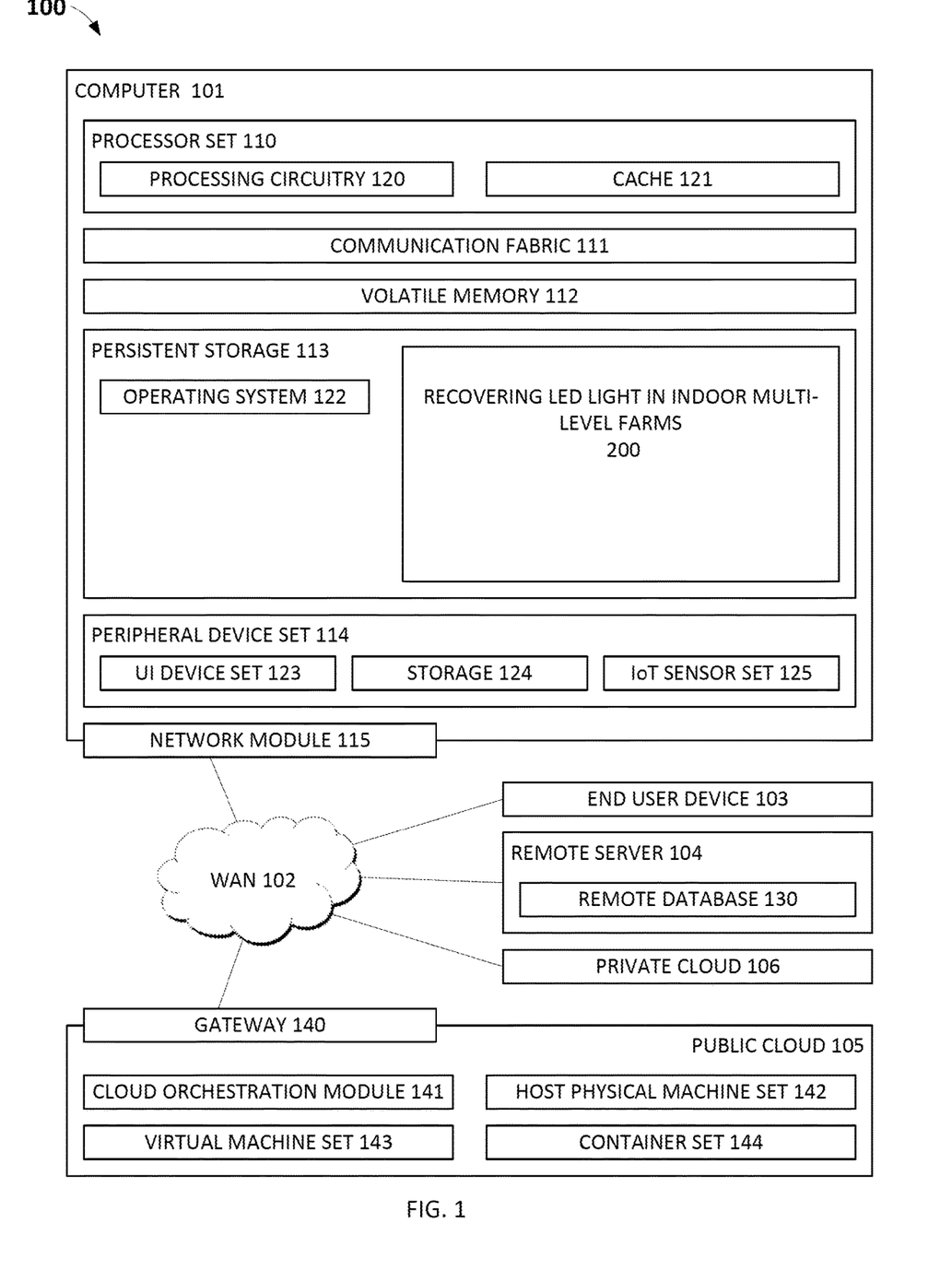
FIG. 1 illustrates the operating environment of a computer server embodying a system for recovering LED light in indoor multi-level farms using augmented reality.

Beginning now with FIG. 1, an illustration is presented of the operating environment of a networked computer, according to an embodiment of the present invention.

Computing environment 100 contains an example of an environment for the execution of at least some of the computer code involved in performing the inventive methods, such as recovering LED light in indoor multi-level farms 200 (system). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, an administrator that operates computer 101), and may take any of the forms discussed above in connection with computer 101. For example, EUD 103 can be the external application by which an end user connects to the control node through WAN 102. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts an example indoor multi-level agricultural (farm) 250 environment where embodiments of the present invention can be practiced. The farm 250 may be in an enclosed space without window openings that admit light that may interfere with the LED lights 210.

In FIG. 2, the farm 250 includes several vertical farming areas, each of which includes one or more plant trays 215. The density and species of the plantings within the trays may vary, but the goal for the plant placement is to optimize the light to reduce spillage, and to optimize the nutrients supplied to the plants. For example, the plant trays 215 may be segregated such that each one includes only one particular plant species, or such that each of the plant trays 215 includes the same planned harvest date. Thus, as whole plant trays 215 are harvested, personnel may replace them with the same plant species or with another plant species that has the same light and nutrient requirements.

A series of cameras and/or sensors 225 may be deployed to monitor the amount, quality, and direction of the light reaching the plants, as well as the light being wasted by flowing outside of the areas 205 not containing plants. An example of potentially wasted light includes light passing through vertical farming layers and light reflected from interior surfaces. Two cameras/sensors 225 are shown as examples and are placed on support members within the farm 250. However, the type and placement of the cameras/sensors 225 are flexible, and the cameras/sensors 225 may be free-standing, or may be positioned on posts, walls, floor, shelves, or other structural members within the farm 250. Additionally, all or some of the cameras/sensors 225 may be mobile (portable), as when mounted on wheeled stands.

Figure 4:
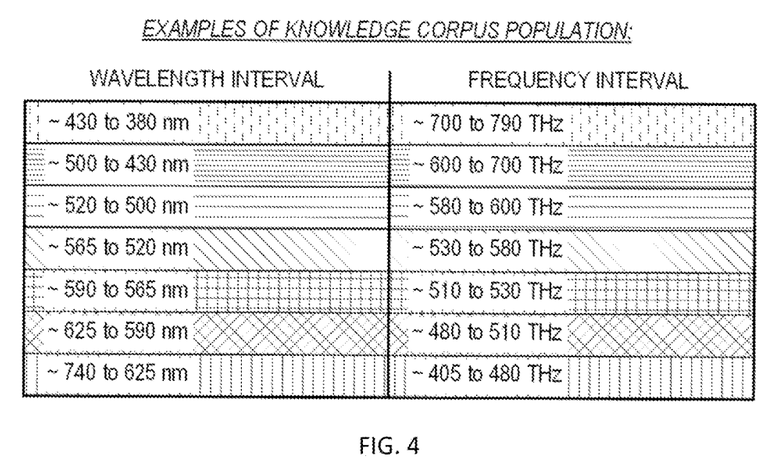
FIG. 4 is a block diagram illustrating a wavelength spectrum of visible light.
Figure 5:
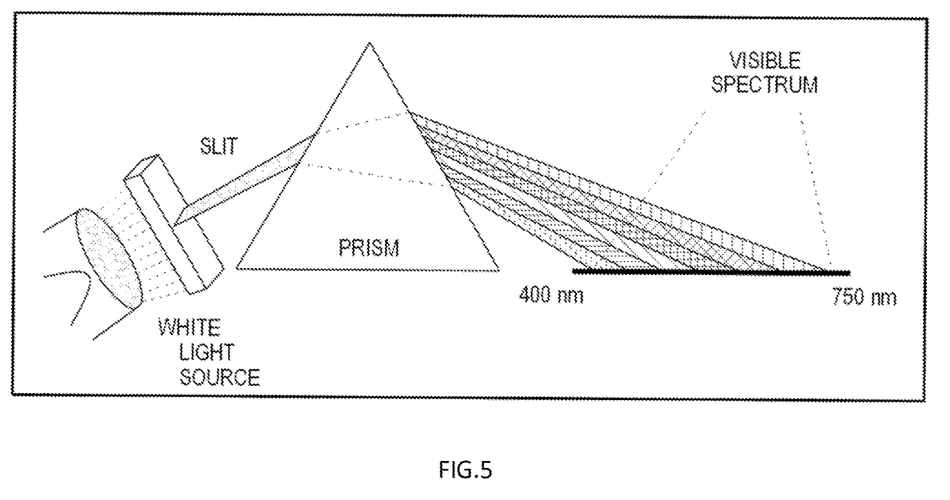
FIG. 5 is an illustration of light dispersion through a prism.

The cameras/sensors 225 capture images of the farm 250 interior in real time. The frequency in which each of the cameras/sensors 225 execute the capture (e.g., frames per second) may be a configurable parameter. In addition to images, the cameras/sensors 225 capture the intensity, identify the source of light, and the direction of light flow from the source. The system 200 uses these captured images to differentiate the planting areas 215 from the rest of the farm 250, and to deconstruct the captured light data into its component wavelengths, as shown in FIGS. 4-5. Additionally, personnel at the farm 250 may wear AR glasses to observe the direction, hue, and intensity of the spectrum of the light. Without the AR glasses, the light would merely be observed as warm or cool, depending on the type of lightbulb producing it. By making the spectrum visible, the AR glasses can show the wearer what opportunities exist for capturing the light by showing what kind of light is being used or wasted.

The LED lights 210 are illustrated as being mounted to the bottoms of the plant trays 215, so that they illuminate plants in the plant trays 215 below them. As shown, the LED lights 210 are fixed in position. However, in an embodiment, the distance of the LED lights 210 from the plants in the plant trays 215 may be adjustable (e.g., closer to or farther from the plants) to accommodate different plant species. Additionally, the LED lights 210 may be covered by a protective shield, such as one made of a plastic or glass. Each of the LED lights 210 may be covered individually, or a protective shield may be attached to the bottom of the plant tray 215, such that the entire bank of LED lights 210 is covered. Further, the protective shield may be clear such that is does not alter the amount and quality of light passing through it. Alternatively, the protective shield and/or each of the LED lights 210 may be colored according to the light quality and spectrum requirements of the plants, and the protective shield may be shaped, for example concave or convex, to be more effective in directing the light and to reduce light spillage.

The areas 205 indicate areas where the LED lights 210 are illuminating areas where plants do not exist, and therefore are areas of opportunity for recovery and reduction of light spillage. For example, obvious areas are 205 between the plant trays 215 where no plantings exist, and the walls and floor areas.

The panels 220 illustrate exemplary light recovery panels that may be positioned, e.g., raised, lowered, tilted, to maximize light capture with the least amount of obstruction of light reaching the plants. For example, the arrows 212 indicate potential for vertical movement, while the arrows 211 indicate potential for pitch rotation around an axis. The panels 220 may include panels constructed of various reflective materials, such as plastics, mylar, and mirror. The various reflective materials may include those that are solid, those that have a degree of transparency, or those having perforations. The panels 220 may include solar panels, which are used to capture the light that the LEDs generate. Additionally, the solar panels may be engaged to capture any natural light that skylights, if present, may generate.

The choice of reflective materials for the panels 220 depend on the requirements of the particular farm 250. The type and location of the panels 220 in the farm 250 is not limited to those shown. Placement is flexible, and panels 220 may include free-standing, on posts, walls, floor, shelves, or other structural members within the farm 250. Additionally, all or some of the panels 220 may be mobile (portable), for example placed on wheeled stands.

The system 200 ingests the captured images and light data through an API into image recognition software for further analysis. In an embodiment, a repository of overlays may be installed in the system 200 for use with the cameras/sensors 225 during the image recognition. Each overlay may correspond to specific areas in the farm 250 and clearly outline the boundaries of the specific area. In that way, the system 200 can identify areas having light spilling outside the intended planting areas 215. Typical image recognition software includes IBM Watson™ Visual Recognition, or Azure Computer Vision (IBM Watson™ is a trademark of IBM in the United States. Azure is a trademark of the Microsoft group of companies). The further analysis of the image data includes plant species recognition, stage of growth, and indications of plant disease such as discoloration, wilting, leaf drop, Color analysis includes separating the captured light into its wavelength components, and determining the length of the various wavelength components, and their source origin (e.g., reflected off a surface, direct from LED lights 210) and destination. The wavelength source origin and destination combination can indicate whether the light is properly directed from the LED lights 210 to the plants, or whether an amount of light is wasted, for example by a surface reflecting the light off the surface and away from the plants. The color analysis, coupled with the source origin and destination data, indicates the pattern of dispersion of the color wavelengths in the farm 250. The system 200 feeds the analyzed image and color data into a model that is trained to track and predict improvements in plant growth by identifying areas of wasted (misdirected) light. Based on the plant species in the farm 250, the system 200 identifies the best match in the model along with the best match for the current growth stage, and overall health. Based on finding the match, the system 200 predicts the optimal amount and wavelength of the light that the plants should receive for the best results. Based on the captured current light conditions in the farm 250, the system 200 redirects the wasted light, based on the current data vs. the historical model data. The process may be viewed as a feedback loop, whereby data is collected, ingested, analyzed, and results predicted. The model is updated with a statistical deviation, if any, between the predicted results and the actual results, thus improving the model.

In response to the model identifying how usage of any wasted light may be improved, the system 200 instructs one or more robots (not shown) to reposition one or more of the panels 220. Repositioning can include moving a panel 220 along its plane of motion, such as pitch 211 rotation, or vertically 212, depending on the ability of the particular panel. For example, the panels 220 that may be positioned elsewhere around the farm 250 may be able to move relative to an x-y-z axis to reflect light back to the plants. The farm 250 may have a variety of robot types available, such as simply an actuator attached to a panel, or a robot that is separate from a panel and deploys in response to receiving instructions from the system 200. The type and placement of the robots are flexible, and may be free-standing, or may be positioned on posts, walls, floor, shelves, or other structural members within the farm 250. It should be noted that the wasted light may first be filtered to select the best wavelengths for optimal plant growth, as predicted by the model.

Figure 3:
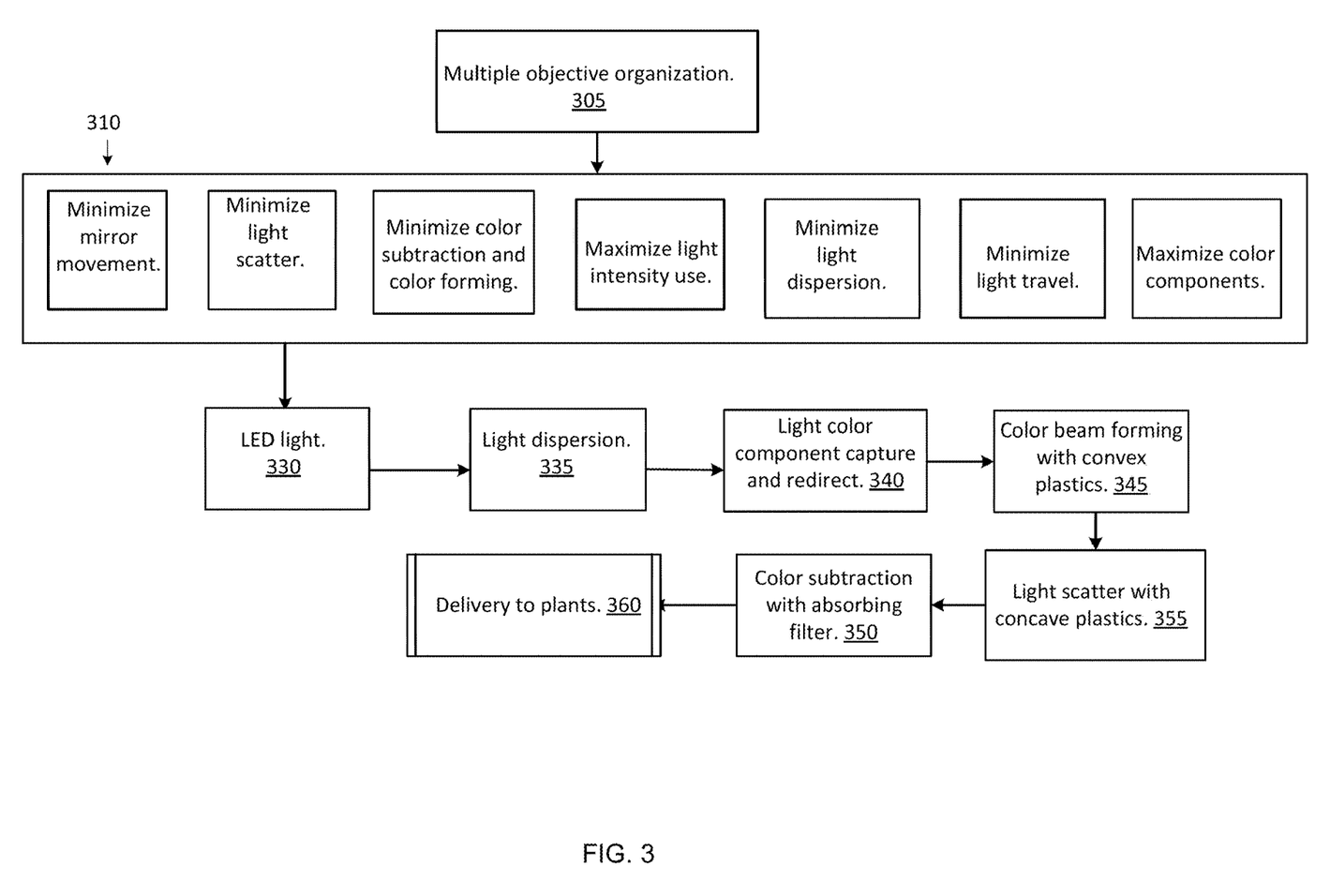
FIG. 3 is a flow chart block diagram of a process for capturing the unused LED light in the indoor-multi-level farm in accordance with the present disclosure.

FIG. 3 is an example of how a strategy, such as an n-queens strategy, is used to find candidate solutions for resource placement, whereby the most efficient topology for the panels 220 placement is selected for delivering the optimal type and amount of light to the plants. FIG. 3 depicts the organization for multiple objective optimization (305), where the objectives include at least: 1) to generate the best type of light at the lowest amount of energy for energy consumption; 2) the selection of the best plant species, and their optimal placement, to produce the best possible results with the least amount of energy usage; and 3) to identify and capture any light spillage with recovery panels, e.g., solar, mirrors or other. In multiple objective problems, optimal decisions may be made in terms of trade-offs between two or more conflicting objectives. The best success would be to maximize all three objectives without obstructing light delivery to the plants.

The actions 310 are examples of many different ways to manipulate the light in terms of n-queen constraints. For example, it may be a constraint that to minimize light scatter, mirror movement should also be minimized. Visible LED light (330) is part of the light generation delivery mechanism. The cameras/sensors 225 receive the visible LED light and disperses it (335) into its full spectrum wavelengths. The optimal path for a light beam to reach and activate the desired photosynthesis processes may be determined based on alterations the system 200 performs on the wavelengths (340), through recursive interaction with the model. For example, color beam forming using convex lenses of various materials (345) takes parallel light rays passing through the convex lenses to converge them to a focal point. This process results in capturing a finer beam of light passing out of the lens that can be directed back to the plants. Alternatively, the captured light may be passed through a concave lens of various materials (355), e.g., plastics, to scatter the parallel light outward thereby spreading the light to cover a wider area of plants. Any of these actions may be performed on the captured light. Color subtraction using an appropriate color absorbing filter (350) may be applied to the output of the previously altered light or may be performed only on the captured LED light. The system 200 indicates the choice of filter to use based on the model having identified the plant species, growth stage, and general plant health. Using analysis of the captured LED light as input, the model may predict which action and/or filter, if any, may optimize the plant production while minimizing wasted light. Farm 250 personnel may wear AR glasses to monitor the results of each iteration of the model's prediction during the process. For example, a constraint may be added to include a configuration threshold parameter that a predicted improvement exceeds a certain percentage. While the model may predict an improvement less than that threshold, the model may be trained to disregard those improvements as costing more in effort or energy to produce and are therefore unsustainable. The system 200 may perform the light manipulations shown in FIG. 3 on a physical selection of lenses, filters or other devices that may be portably mounted, for example on wheeled stands or posts. These devices may be moved/deployed, as needed, by robots in the farm 250 in response to instructions from the system 200. Alternatively, or in addition, the system 200 may simulate the light manipulations shown in FIG. 3 using a selection of virtual physical lenses and filters. Such a virtual selection adds flexibility to the system 200 operation by allowing rapid reconfiguration (add/change/remove virtual components) in comparison to the physical devices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "configured to", "operable to", "coupled to", or "operably coupled to" indicates that an item includes one or more of power connections, input(s), output(s), etc., to perform, when activated, one or more of its corresponding functions and may further include inferred coupling to one or more other items. As may still further be used herein, the term "associated with," includes direct and/or indirect coupling of separate items and/or one item being embedded within another item.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
    capturing in real time from a plurality of cameras and sensors in a vertical farm environment a plurality of camera images and sensor data, wherein the camera images include physical images of the vertical farm environment and the sensor data includes light data;
    analyzing the captured plurality of camera images and sensor data to identify a pattern of light origin and direction in the vertical farm environment;
    identifying plant characteristics based on comparing the captured camera images, using image recognition, against a model;
    based on the identified plant characteristics, manipulating the light data, wherein the manipulating comprises:
    splitting the light data into its component visible light wavelengths; and
    based on the plant characteristics, redirecting a quantity of wasted light from one or more light sources to one or more areas of plants, wherein the redirected quantity of wasted light corresponds to a difference between an amount of light being received by the one or more areas of plants and an optimal amount of light specified in the model; and wherein the redirecting is performed by dynamic repositioning of one or more reflective surfaces by one or more robots, wherein the one or more robots include an actuator affixed to the one or more reflective surfaces, robots acting separately, and robots acting cooperatively in a swarm.

2. The method of claim 1, wherein the origin of the light data comprises a plurality of LED lights and reflected light from surfaces in the vertical farm environment.

3. The method of claim 1, further comprising:
    based on the captured camera images and the captured sensor data, determining areas of potentially wasted light, wherein potentially wasted light is light falling on unplanted areas in the vertical farm environment, including empty areas of plants, and mobile and stationary reflective surfaces.

4. The method of claim 3, wherein the mobile reflective surfaces can move in vertically, and can pitch rotation around an axis.

5. The method of claim 1, further comprising a comprehensive feedback iterative loop, wherein the model is updated using the captured camera images and the captured sensor data and results from the manipulating the light data.

6. The method of claim 1, wherein the sensors are positioned on posts, walls, floor, shelves, or on wheeled stands.

7. The method of claim 1, wherein the cameras are positioned on posts, walls, floor, shelves, or on wheeled stands.

8. A computer program product, the computer program product comprising a non-transitory tangible storage device having program code embodied therewith, the program code executable by a processor of a computer to perform a method, the method comprising:
    capturing in real time from a plurality of cameras and sensors in a vertical farm environment a plurality of camera images and sensor data, wherein the camera images include physical images of the vertical farm environment and the sensor data includes light data;
    analyzing the captured plurality of camera images and sensor data to identify a pattern of light origin and direction in the vertical farm environment;
    identifying plant characteristics based on comparing the captured camera images, using image recognition, against a model;
    based on the identified plant characteristics, manipulating the light data, wherein the manipulating comprises:
    splitting the light data into its component visible light wavelengths; and
    based on the plant characteristics, redirecting a quantity of wasted light from one or more light sources to one or more areas of plants, wherein the redirected quantity of wasted light corresponds to a difference between an amount of light being received by the one or more areas of plants and an optimal amount of light specified in the model; and wherein the redirecting is performed by dynamic repositioning of one or more reflective surfaces by one or more robots, wherein the one or more robots include an actuator affixed to the one or more reflective surfaces, robots acting separately, and robots acting cooperatively in a swarm.

9. The computer program product of claim 8, wherein the origin of the light data comprises a plurality of LED lights and reflected light from surfaces in the vertical farm environment.

10. The computer program product of claim 8, further comprising:
    based on the captured camera images and the captured sensor data, determining areas of potentially wasted light, wherein potentially wasted light is light falling on unplanted areas in the vertical farm environment, including empty areas of plants, and mobile and stationary reflective surfaces.

11. The computer program product of claim 10, wherein the mobile reflective surfaces can move in vertically, and can pitch rotation around an axis.

12. The computer program product of claim 8, further comprising a comprehensive feedback iterative loop, wherein the model is updated using the captured camera images and the captured sensor data and results from the manipulating the light data.

13. The computer program product of claim 8, wherein the sensors are positioned on posts, walls, floor, shelves, or on wheeled stands.

14. The computer program product of claim 8, wherein the cameras are positioned on posts, walls, floor, shelves, or on wheeled stands.

15. A computer system, comprising:
    one or more processors;
    a memory coupled to at least one of the processors;
    a set of computer program instructions stored in the memory and executed by at least one of the processors in order to perform actions of:
    capturing in real time from a plurality of cameras and sensors in a vertical farm environment a plurality of camera images and sensor data, wherein the camera images include physical images of the vertical farm environment and the sensor data includes light data;
    analyzing the captured plurality of camera images and sensor data to identify a pattern of light origin and direction in the vertical farm environment;
    identifying plant characteristics based on comparing the captured camera images, using image recognition, against a model;
    based on the identified plant characteristics, manipulating the light data, wherein the manipulating comprises:
    splitting the light data into its component visible light wavelengths; and based on the plant characteristics, redirecting a quantity of wasted light from one or more light sources to one or more areas of plants, wherein the redirected quantity of wasted light corresponds to a difference between an amount of light being received by the one or more areas of plants and an optimal amount of light specified in the model; and wherein the redirecting is performed by dynamic repositioning of one or more reflective surfaces by one or more robots, wherein the one or more robots include an actuator affixed to the one or more reflective surfaces, robots acting separately, and robots acting cooperatively in a swarm.

16. The computer system of claim 15, further comprising: based on the captured camera images and the captured sensor data, determining areas of potentially wasted light, wherein potentially wasted light is light falling on unplanted areas in the vertical farm environment, including empty areas of plants, and mobile and stationary reflective surfaces.

17. The computer system of claim 15, wherein the origin of the light data comprises a plurality of LED lights and reflected light from surfaces in the vertical farm environment.

* * * * *